US010960328B2

(12) United States Patent
Wade et al.

(10) Patent No.: US 10,960,328 B2
(45) Date of Patent: Mar. 30, 2021

(54) PARTICLE SEPARATION SYSTEM AND METHOD

(71) Applicant: Pentair Filtration Solutions, LLC, St. Paul, MN (US)

(72) Inventors: Philip Wade, Conroe, TX (US); Tanner R. Dendy, Conroe, TX (US); Carl Hahn, Conroe, TX (US); Kyle Jenkins, Houston, TX (US)

(73) Assignee: Pentair Filtration Solutions, LLC, Hanover Park, IL (US)

( * ) Notice: Subject to any disclaimer, the term of this patent is extended or adjusted under 35 U.S.C. 154(b) by 427 days.

(21) Appl. No.: 15/806,245

(22) Filed: Nov. 7, 2017

(65) Prior Publication Data

US 2018/0126306 A1    May 10, 2018

Related U.S. Application Data

(60) Provisional application No. 62/419,296, filed on Nov. 8, 2016.

(51) Int. Cl.
*B01D 29/52*     (2006.01)
*B01D 35/027*    (2006.01)
(Continued)

(52) U.S. Cl.
CPC ............ *B01D 29/52* (2013.01); *B01D 29/114* (2013.01); *B01D 29/13* (2013.01); *B01D 29/605* (2013.01);
(Continued)

(58) Field of Classification Search
CPC .. B01D 61/18; B01D 63/082; B01D 2313/54; B01D 2315/06; B01D 2313/56;
(Continued)

(56) References Cited

U.S. PATENT DOCUMENTS 3,744,633 A   7/1973   Schmidt, Jr. et al.
4,349,434 A   9/1982   Jaworski
(Continued)

FOREIGN PATENT DOCUMENTS

WO     2005118115 A1    12/2005

OTHER PUBLICATIONS

International Search Report and Written Opinion, International Application No. PCT/US2017/060457, dated Dec. 28, 2017, 11 pages.
(Continued)

*Primary Examiner* — Liam Royce
(74) *Attorney, Agent, or Firm* — Husch Blackwell LLP

(57) ABSTRACT

A particle separation system may comprise a vessel having at least one side wall and a bottom wall forming an internal chamber within the vessel, a filtration unit positioned within the vessel and including a first filtration pack including a first plurality of filter elements, an inlet for moving pre-separated fluid into the vessel, and an outlet in fluid communication with the filtration pack for moving processed fluid out of the vessel, a rate of pre-separated fluid flow into the vessel and a rate of processed fluid flow out of the vessel each being between about 10 and about 1000 gallons per minute (GPM) and a flux within the filtration unit is less than or equal to about 0.05 gallons per minute per square foot (GPM/ft$^2$).

19 Claims, 12 Drawing Sheets

(51) Int. Cl.
  *C02F 1/00* (2006.01)
  *B01D 29/60* (2006.01)
  *B01D 29/66* (2006.01)
  *B01D 29/11* (2006.01)
  *B01D 35/30* (2006.01)
  *B01D 29/13* (2006.01)
  *B01D 29/90* (2006.01)

(52) U.S. Cl.
  CPC ........... *B01D 29/66* (2013.01); *B01D 29/902* (2013.01); *B01D 35/0273* (2013.01); *B01D 35/303* (2013.01); *C02F 1/004* (2013.01)

(58) Field of Classification Search
  CPC .. B01D 2313/06; B01D 29/52; B01D 29/114; B01D 29/605; B01D 29/66; B01D 29/13; B01D 23/902; B01D 35/0273; B01D 35/303; C02F 1/444; C02F 1/004
  See application file for complete search history.

(56) References Cited

U.S. PATENT DOCUMENTS

| | | | |
|---|---|---|---|
| 4,552,669 A | 11/1985 | Sekellick | |
| 5,133,871 A | 7/1992 | Levy | |
| 5,183,572 A | 2/1993 | Benn | |
| 5,194,149 A * | 3/1993 | Selbie | B01D 35/303 210/232 |
| 5,330,638 A | 7/1994 | Burklund et al. | |
| 5,427,679 A | 6/1995 | Daniels | |
| 5,520,801 A | 5/1996 | Gerber et al. | |
| 6,749,068 B1 | 6/2004 | Dias | |
| 2005/0092665 A1 | 5/2005 | Kirchner | |
| 2007/0151916 A1* | 7/2007 | Knappe | B01D 61/18 210/321.74 |
| 2009/0045128 A1 | 2/2009 | Murray et al. | |
| 2009/0095689 A1 | 4/2009 | Keenan | |
| 2013/0221546 A1* | 8/2013 | Christ | B01D 61/18 261/22 |
| 2015/0252934 A1* | 9/2015 | Ohta | F16L 3/221 210/323.1 |
| 2015/0273365 A1* | 10/2015 | Laverdiere | F16L 19/025 210/321.6 |
| 2015/0299583 A1 | 10/2015 | Kelsey | |
| 2015/0307365 A1 | 10/2015 | Baird et al. | |
| 2018/0079671 A1* | 3/2018 | Wang | C02F 1/32 |

OTHER PUBLICATIONS

Extended European Search Report, European Application No. 17868893.3, dated May 18, 2020, 7 pages.

* cited by examiner

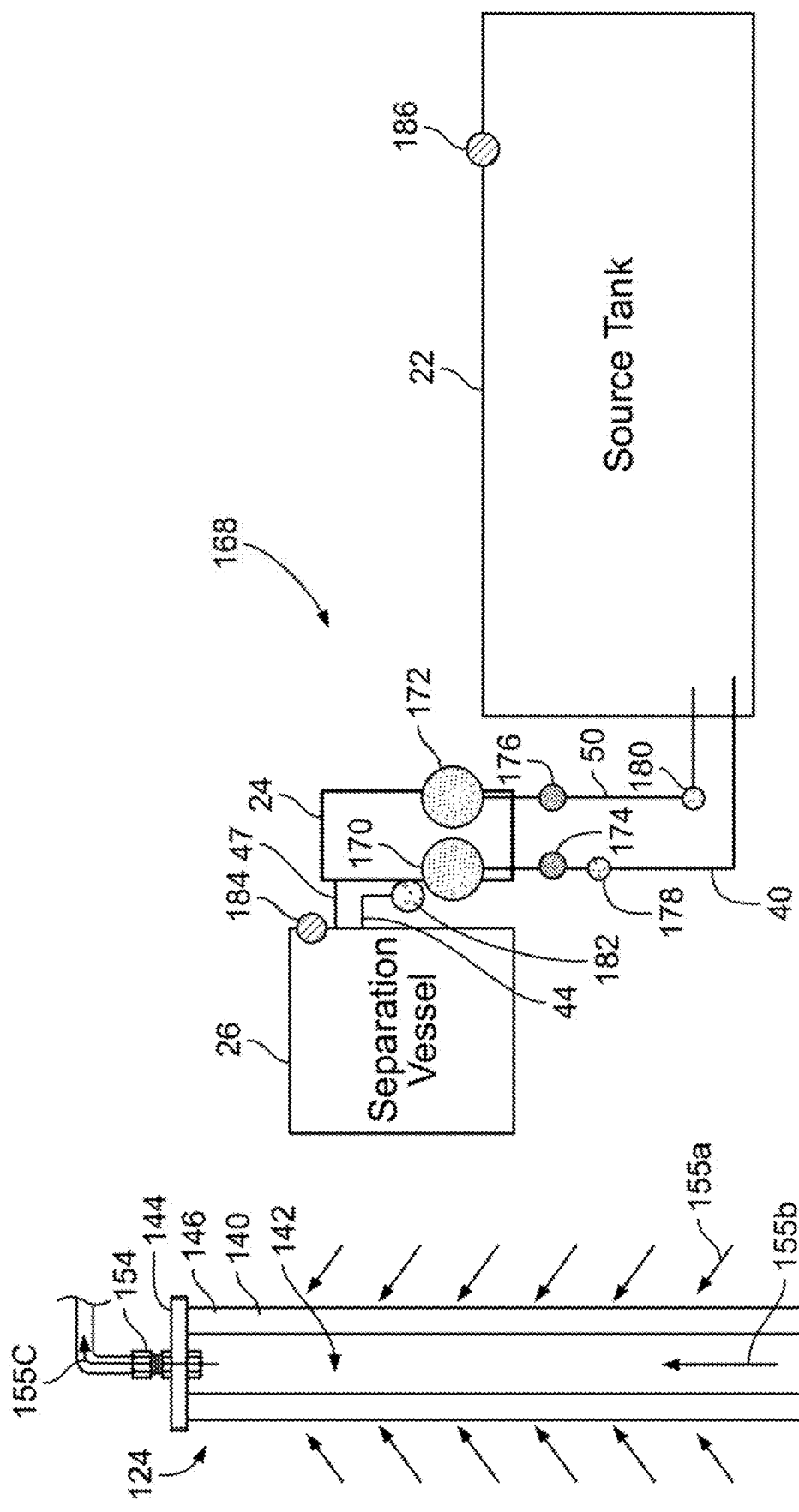

PARTICLE SEPARATION SYSTEM AND METHOD

CROSS REFERENCE TO RELATED APPLICATIONS

The present application claims the benefit of U.S. Application Ser. No. 62/419,296, filed Nov. 8, 2016, and entitled "Particle Separation System and Method," which is hereby incorporated by reference herein in its entirety.

BACKGROUND

Petroleum producers, refiners, construction de-watering systems, gas processors (including onshore and offshore), and chemical manufacturers utilize separation systems to filter, process, and recover chemical products, such as particulates, hydrocarbons, etc., from a variety of raw material process streams. Separation systems of this nature generally have an inlet stream that can comprise a complex heterogeneous mixture of solids, liquids, and gaseous materials that require processing to achieve separation of one or more components with a predetermined efficiency. Developers of separation systems are always looking for ways to increase the efficiency and output and decrease the overall operating costs of such systems.

SUMMARY

Some embodiments provide a particle separation system may comprise a vessel having at least one side wall and a bottom wall forming an internal chamber within the vessel, a filtration unit positioned within the vessel and including a first filtration pack including a first plurality of filter elements, an inlet for moving pre-separated fluid into the vessel, and an outlet in fluid communication with the filtration pack for moving processed fluid out of the vessel, a rate of pre-separated fluid flow into the vessel and a rate of processed fluid flow out of the vessel each being between about 10 and about 1000 gallons per minute (GPM) and a flux within the filtration unit is less than or equal to about 0.05 gallons per minute per square foot ($GPM/ft^2$).

Other embodiments provide, a particle separation system comprising, a vessel having at least one side wall and a bottom wall forming an internal chamber within the vessel, a filtration unit positioned within the vessel and comprising a first filtration pack comprising a first plurality of filter elements having a first plurality of outlets, a first hollow manifold having a first plurality of inlets, a number of the first plurality of inlets being equal to a number of the first plurality of outlets, the first plurality of outlets and the first plurality of inlets being capable of coupling such that a flow through each of the first plurality of filter elements enters the first manifold, the first hollow manifold including a first outlet channel for flow from the first manifold to a processed fluid conduit, a second filtration pack comprising a second plurality of filter elements having a second plurality of outlets, a second hollow manifold having a second plurality of inlets, a number of the second plurality of inlets being equal to a number of the second plurality of outlets, the second plurality of outlets and the second plurality of inlets being capable of coupling such that a flow through each of the second plurality of filter elements enters the second manifold, the second hollow manifold including a second outlet channel for flow from the second manifold to the processed fluid conduit.

Still other embodiments provide a method of separating particles from fluid, the method comprising the steps of moving pre-separated fluid through an inlet into a vessel at atmospheric pressure, the vessel having at least one side wall and a bottom wall forming an internal chamber within the vessel, wherein the pre-separated fluid is moved into the vessel at a rate of between about 10 and about 1000 gallons per minute (GPM), moving the pre-separated fluid into and through a filtration unit utilizing a downstream pump, the filtration unit including a plurality of filtration packs each having a plurality of filter elements, thereby creating a flux in the filtration pack of less than or equal to about 0.05 gallons per minute per square foot ($GPM/ft^2$), and moving fluid processed by the filtration unit to an outlet and out of the vessel.

DESCRIPTION OF THE DRAWINGS

FIG. 5 is a cross-sectional view of a single filter element of the filtration pack depicted in FIG. 4, and depicting a flow of fluid through the filter element;

FIG. 6 is a diagram depicting various possible sensors and instruments that can be utilized within the separation system of FIG. 1;

DETAILED DESCRIPTION

Figure 1:
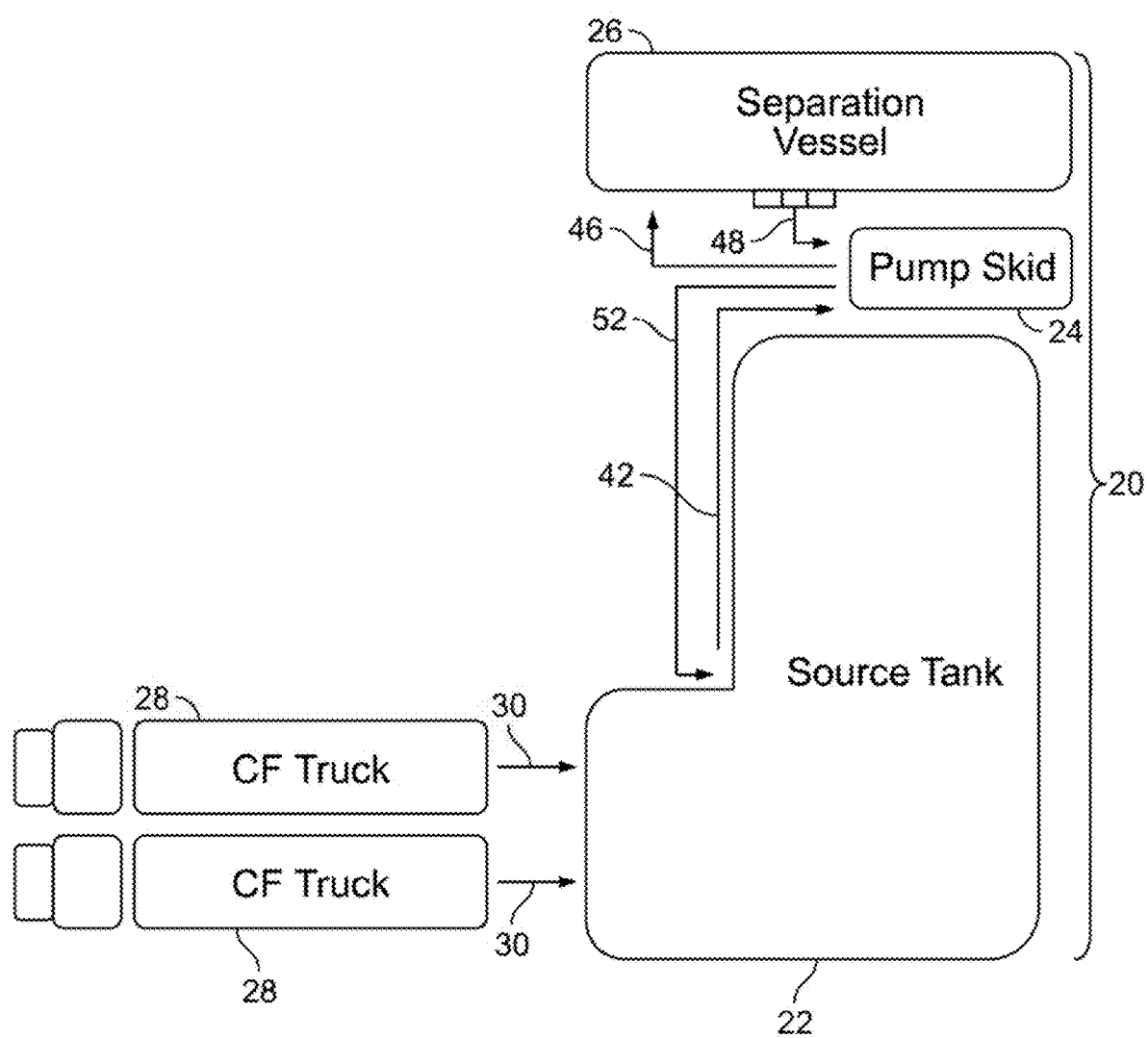
FIG. 1 is a diagram depicting an exemplary particle separation system according to some aspects of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Referring now to FIG. 1, an exemplary particle separation system 20 is depicted. The particle separation system generally includes a source tank(s) 22 holding pre-separated fluid to be processed by the particle separation system 20, a pump system 24 that is configured to move fluid through the particle separation system 20, and a separation vessel 26 for separating solids from fluids. While a source tank 22 is depicted, a pressurized flow (e.g., at a varying flow rate) of pre-separated fluid can be received from some other process or any other suitable source.

Pre-separated fluid is transferred into the source tank(s) 22, for example, by trucks 28. In the depicted embodiment, the trucks 28 are filled with pre-separated fluid at a remote location and transported to the location of the particle separation system 20. The pre-separated fluid can be transferred from the trucks 28 to the source tank(s) 22 in any suitable manner. In other illustrative embodiments, the pre-separated fluid can be transferred to the source tank(s) 22 is other manners, for example, through a pressurized flow from another location. Alternatively, the pre-separated fluid can be transferred by any suitable vehicle, vessel, or fluid transfer system. Still further, while the fluid in the source tank(s) 22 is referred to herein as being pre-separated fluid, the fluid can be any pre-separated fluid capable of separation into solids and fluids. More particularly, pre-separated fluid refers to any fluid, for example, water, an amine, or any other fluid, that is contaminated by dirt or other debris, hydrocarbons, chemicals, and/or any other contaminants regardless of the form (e.g., solid, liquid, etc.). In some embodiments, the pre-separated fluid is produced water, which is a by-product of hydrocarbon extraction methods and consists of water mixed with oil and particulate of various concentrations. In some embodiments, the pre-separated fluid is waste water, for example, from a refinery, chemical plant, gas plant, or other similar location. In still other embodiments, the pre-separated fluid is industrial waste water, run-off, or construction de-watering. Produced and waste water are both by-products of chemical processes that must be treated before reuse or disposal.

Figure 2:
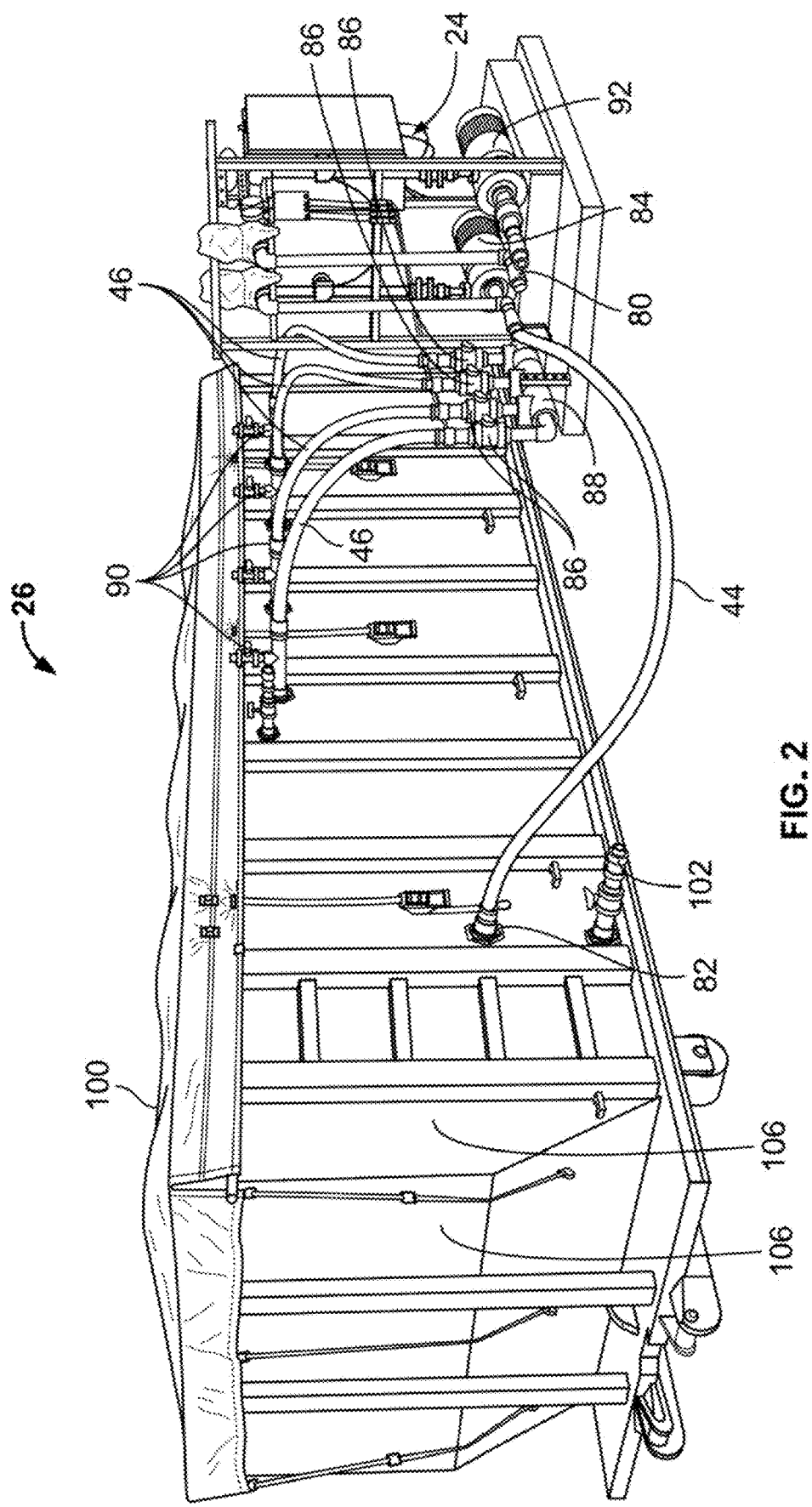
FIG. 2 is a top perspective view depicting a separation vessel and a pump system of the particle separation system depicted in FIG. 1.

Referring to FIGS. 1 and 2, the flow of fluid in the particle separation system 20 is also depicted. Arrow 30 depicts the transfer of pre-separated fluid from, for example, the trucks 28 to the source tank(s) 22. Pre-separated fluid in the source tank(s) 22 is pumped through a first transfer or inlet line 40 (arrow 42) to the pump system 24 and through a second transfer or outlet line 44 (arrow 46) to the separation vessel 26. After the pre-separated fluid is filtered in the separation vessel 26, processed fluid (i.e., pre-separated fluid that has been processed by the separation vessel 26, for example, water, amine, or any other suitable fluid) is pumped through a third transfer or inlet line 47 (arrow 48) to the pump system 24 and through a fourth transfer or outlet line 50 (arrow 52) back to the source tank(s) 22. While the source tank 22 for produced and processed fluid is shown as being the same, different tanks or different compartments within the same tank can be utilized.

While a single source tank 22, a single pump system 24, and a single separation vessel 26 are depicted in FIG. 1, the particle separation system 20 can include any suitable number of source tanks 22, pump systems 24, and/or separation vessels 26.

The pump system 24 and the separation vessel 26 are shown in more detail in FIG. 2. The pump system 24 is depicted as having a pump outlet 80 in fluid communication with a separation vessel inlet 82 by way of the second transfer or outlet line 44 to move pre-separated fluid into the separation vessel 26. The pump system 24 includes an inlet pump 84 that pumps pre-separated fluid from the source tank(s) 22, through the second transfer line 44 into the separation vessel 26. The pump system is also depicted as having a plurality of pump inlets 86 connected to a manifold 88, wherein each of the pump inlets is in fluid communication with a respective separation vessel outlet 90 by way of the third transfer or inlet lines 46. Processed fluid is moved through each of the third transfer lines 46 into the manifold 88 and through the fourth transfer line 50 to the source tank(s) 22 by an outlet pump 92. The manifold 88 streamlines each of the third transfer lines 46 into a single fluid stream to the source tank(s) 22.

Figure 3:
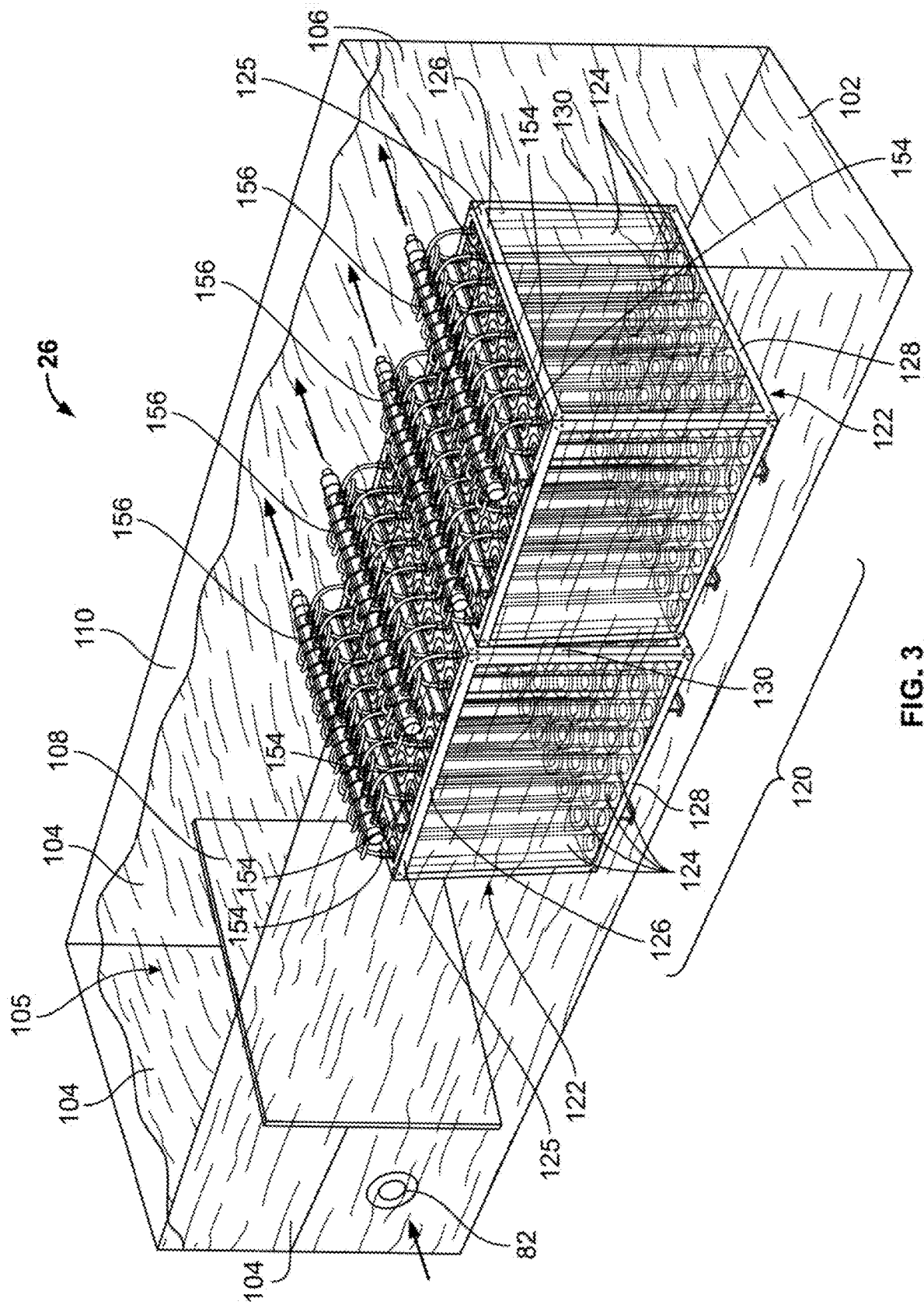
FIG. 3 is a top perspective view of the separation vessel of FIG. 2 with a top wall removed and depicting a front and side wall as transparent to depict internal elements of the separation vessel including a weir, a filtration unit including one or more filtration packs, and outlet manifolds in fluid communication with the filtration packs.

The separation vessel 26 generally includes a top wall or covering 100 (optional), a bottom wall 102, and one or more side walls 104 forming an internal or main filtration chamber 105 within the separation vessel 26, as seen in FIGS. 2 and 3. One or more portions of the separation vessel 26 can be made of fiberglass or another suitable material that can prevent corrosion when pre-separated fluid containing harmful chemicals is processed by the separation vessel 26. In illustrative embodiments, the separation vessel 26 is not pressurized (i.e., is at atmospheric pressure). In other illustrative embodiments, the separation vessel 26 can be pressurized. The separation vessel 26 can include a weir 108 spaced from the separation vessel inlet 82. The separation vessel inlet 82 can be positioned adjacent a bottom of the weir 108 such that pre-separated fluid must travel upwardly and over the weir 108. The weir 108 extends from the bottom wall 102 of the separation vessel 26 and ends short of a fluid height 110 in the separation vessel 26. The weir 108 functions to provide "bulk knock out" of very large particles or bulk oil/immiscible liquid content (that will sink to the bottom of the weir 108 and not enter the main filtration chamber 105) and serve as a strong physical barrier to the filtration technology (e.g., filtration unit, filtration pack, filter elements, etc.) in the event a strong pressurized stream enters the separation vessel 26. In some embodiments, the weir 108 is not utilized.

Figure 4:
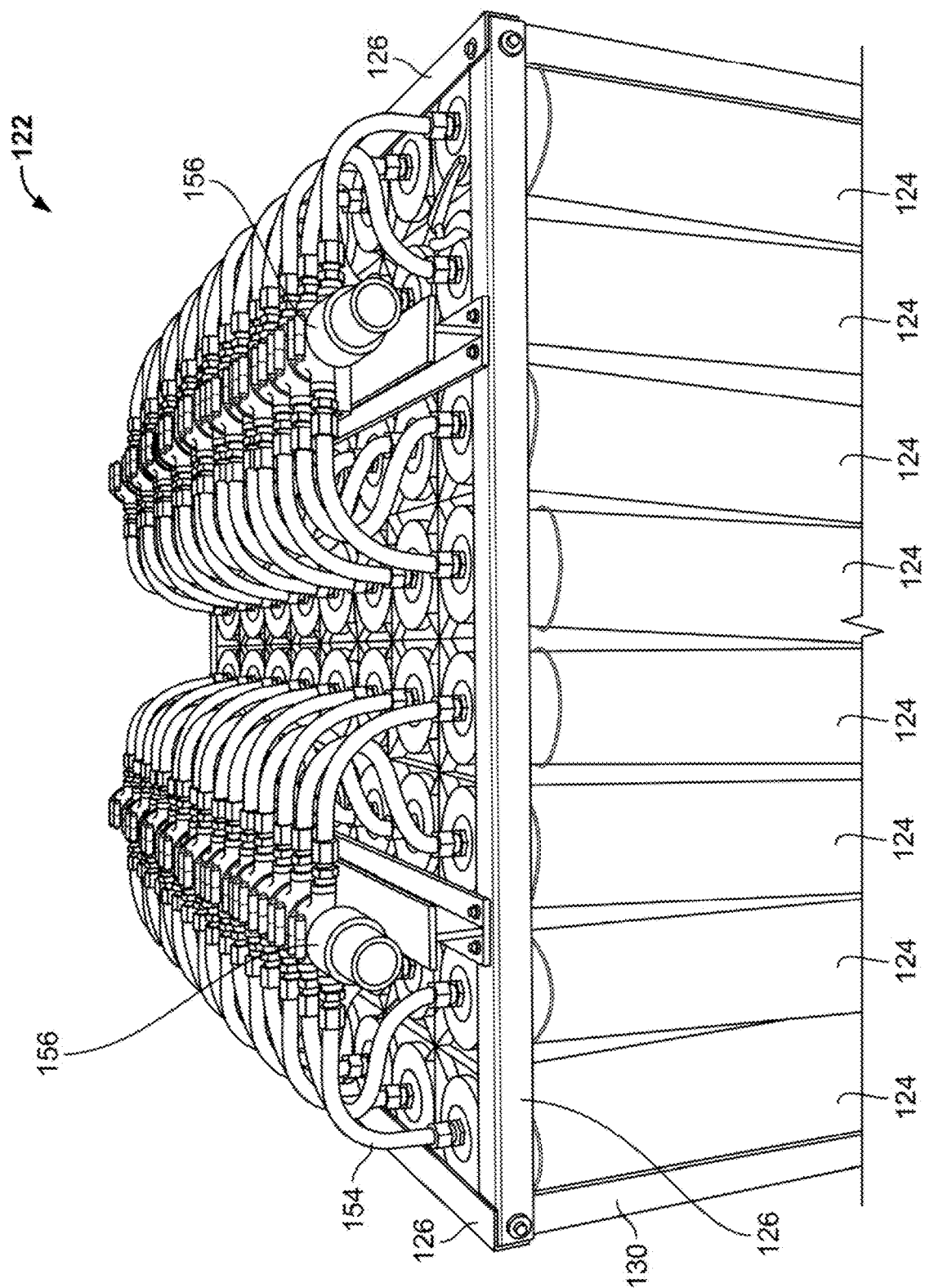
FIG. 4 is a top perspective view of a filtration pack positioned within the separation vessel of FIGS. 2 and 3 for separating fluids and solids.

As seen in FIGS. 3 and 4, a filtration unit 120 is positioned within the internal chamber 105 of the separation vessel 26 after the weir 108 (in a flow path between the separation vessel inlet 82 and the separation vessel outlet 90). The filtration unit 120 is positioned on a suction side of the pump system 24 and can include at least one filtration pack 122 including a plurality of filter elements 124. The filtration pack 122 can include a frame 125 or other structure to which the filter elements 124 are attached. The frame can include a plurality of top struts 126, a plurality of bottom struts 128, and a plurality of side struts 130 connecting the pluralities of top and bottom struts 126, 128. The frame 125 can be constructed of, for example, polyvinyl chloride (PVC), polypropylene, polyethylene, or any other suitable material(s). While a particular frame 125 is depicted, one skilled in the art would understand that different types of frames could be used to support a plurality of filter elements 124 and allow the filtration pack 122 to be replaced, as will be discussed in greater detail below. For example, only one of the top struts 126, the bottom struts 128, and the side struts 130 can be utilized, two of the top struts 126, the bottom struts 128, and the side struts 130 can be utilized, or any other configuration can be utilized to hold and position the filtration packs 122. In illustrative embodiments, the frame 125 provides spacing between the filtration unit 120 and the bottom wall 102 of the separation vessel 26, which allows for accumulation of solids adjacent the bottom wall 102, as will be discussed in greater detail below. In some embodiments, the filtration unit 120 and/or the filtration packs 122 are self-supporting in that they can be set within the separation vessel 26 without being attached to any portion of the separation vessel 26.

Each filtration pack 122 can include any suitable number of filter elements 124, for example, between about 10 and about 1000, between about 100 and about 800, between about 200 and about 600, between about 300 and 500, or about 450 filter elements 124. In an illustrative embodiments, multiple filtration packs 122 each having 25 filter elements 124, can be utilized. In one such embodiment, 18 filtration packs 112 each having 25 filter elements 124 (with a total of 450 filter elements) can be utilized.

Figure 14A:
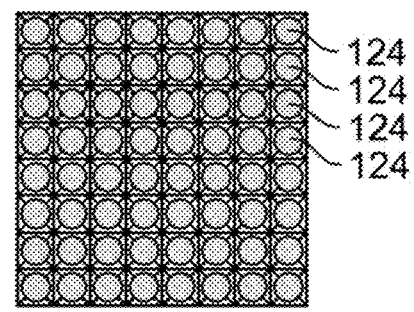
FIGS. 14A-14C depict alternative nesting configurations for filter elements disposed within any filtration pack disclosed herein.
Figure 14B:
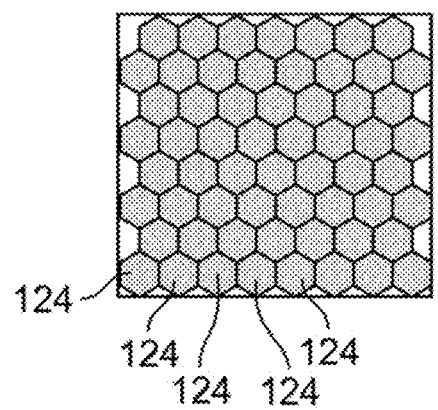
Figure 14C:
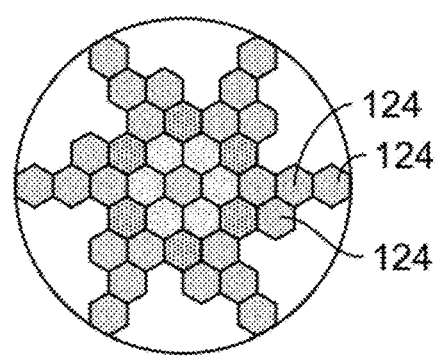

While the filter elements 124 are depicted as being vertical, the filter elements 124 can optionally be horizontal or one or more filtration packs 122 can include filter elements 124 that are vertical and one or more filtration packs 122 can include filter elements 124 that are horizontal. In illustrative embodiments, each of the filter elements 124 in the filtration pack 122 can be parallel to one another. Additionally, while the filter elements 124 are shown as being nested in a square-shape with parallel rows and columns of filter elements 124, as seen in the top elevational view of FIG. 14A, the filter elements 124 can be nested in other configurations. For example, the filter elements 124 of individual rows can be aligned, but the filter elements 124 in adjacent rows can be offset, as seen in FIG. 14B, the filter elements 124 can be formed into a hex ring, as seen in FIG. 14C, or the filter elements 124 can be arranged in any other suitable configuration. Still further, while the filtration packs 122 are shown as being arranged in parallel, the filtration packs 122 can be arranged in series and/or in parallel.

As best seen in FIG. 5, each filter element 124 can generally include filter media 140, which can be for example, cylindrical surrounding a central hollow core 142, a top, open end cap 144 partially enclosing a top end 146 of the filter media 140, and a bottom, closed end cap 148 enclosing a bottom end 150 of the filter media 140. A filter element outlet tube 154 can extend through, for example, the top, open end cap 144 to allow fluid to flow therethrough. The filter media 140 can be non-woven and can be made of, for example, glass blown fibers or any other suitable material. In some embodiments, pore size for the media can be between about 1 and about 500 micrometers. The top, open end cap 144 can be made of, for example, polyester or any other suitable material. In addition, the top, open end cap 144 can include a compression fitting for creating a fluid-tight seal with the filter element outlet tube 154. The bottom, closed end cap 148 can be made of, for example, glass-filled nylon or any other suitable material.

Pre-separated fluid moves from an outside of the filter media 140, through the filter media 140, into the central hollow core 142, and out the filter element outlet tube 154, as shown by arrows 155a-155c, as seen in FIG. 5. Each of the filter element outlet tubes 154 combine into an outlet manifold 156 for movement out of the separation vessel 26. Each of the outlet manifolds 156 is in fluid communication with a respective third transfer line 47 to transfer fluid through the manifold 88 to the source tank(s) 22. Each filtration pack 122 can include any suitable number of outlet manifolds 156 in fluid communication with any suitable number of filter elements 124.

In illustrative embodiments, the filtration unit 120 includes at least two filtration packs 122. In illustrative embodiments, the filtration unit 120 includes two filtration packs 122, each including 64 filter elements 124, as seen in FIG. 3. As described above, each of the filtration packs 122 includes a frame 125, wherein adjacent frames 125 can be removably attached to one another.

Figure 13A:
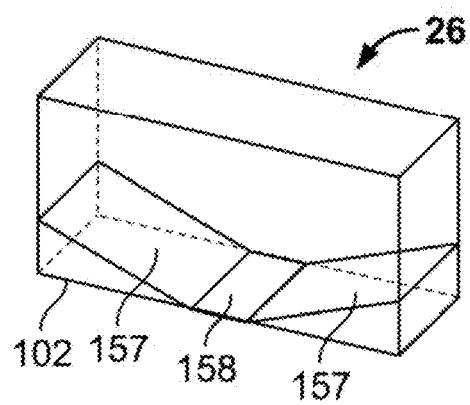
FIGS. 13A-13C depict different exemplary configurations for any of the separation vessels disclosed herein.
Figure 13B:
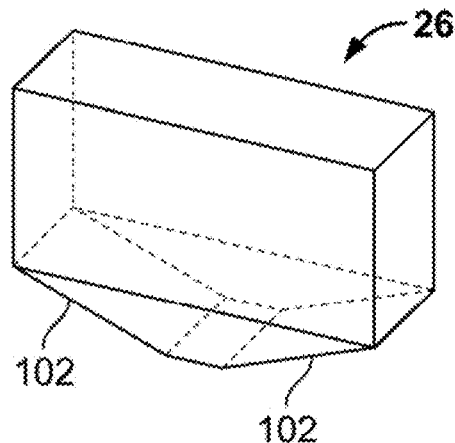
Figure 13C:
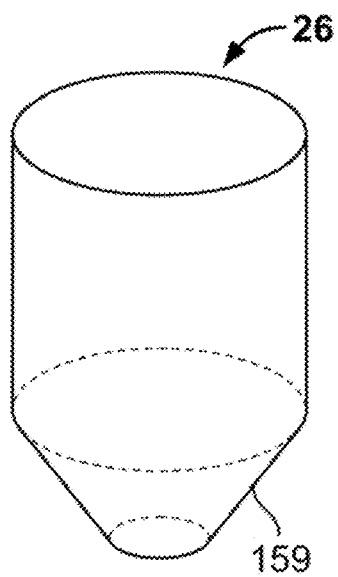

While the separation vessel 26 is shown as being generally rectangular in shape, one skilled in the art will understand that the separation vessel 26 can have any suitable shape, for example, square-shaped, cylindrical, or any other suitable geometric shape. In illustrative embodiments, the separation vessel 26 can include sloped inner surfaces 157 (FIG. 13A) to allow solids separated by the filter elements 124 to collect in a central collection region 158. In other illustrative embodiments, the bottom wall 102 can be sloped, as seen in FIG. 13B. In still other illustrative embodiments, the separation vessel 26 can be cylindrical in shape with an inverted cone bottom end 159, as seen in FIG. 13C. In illustrative embodiments, the separation vessel 26 can include one or more drains 161 in the bottom wall 102, adjacent the bottom wall 102, or in any other suitable location to remove collected solids from the separation vessel 26.

The filtration unit 120, including the filtration packs 122 and the individual filter elements 124 of the filtration packs 122, in combination with the rate of flow through the separation vessel 26 create a low flux through the filtration unit 120. More particularly, by increasing the number of overall filter elements 124 (e.g., by including a number of filtration packs 122 or a single filtration pack 122 with multiple filter elements 124), a total square footage of filter media is increased or maximized. In illustrative embodiments, the flux through the filter elements 124 can be less between about 0.001 gallons per minute per square foot (GPM/ft$^2$) and about 0.05 GPM/ft$^2$. In other illustrative embodiments, the flux through the filter elements 124 can be less than or equal to about 0.01 GPM/ft$^2$. In still other illustrative embodiments, the flux through the filter elements 124 can be less than or equal to about 0.008 GPM/ft$^2$). In yet other illustrative embodiments, the flux through the filter elements 124 can be less than or equal to about 0.005 GPM/ft$^2$. In some embodiments, the flux through the filter elements 124 can be between about 0.001 GPM/ft$^2$ and about 0.01 GPM/ft$^2$, or about 0.005 GPM/ft$^2$. To achieve the desired flux, the flow of pre-separated fluid into the separation vessel 26 and processed fluid out of the separation vessel 26 can be the same. In some illustrative embodiments, the flow of pre-separated fluid into the separation vessel 26 and the flow of processed fluid out of the separation vessel 26 can be between about 10 gallons per minute (GPM) and about 1000 GPM. In other embodiments, both flows can be between about 10 GPM and about 600 GPM or between about 50 GPM and about 400 GPM. In yet other illustrative embodiments, the flow can be about 300 or about 350 GPM. The flow rate can vary, so an overall surface area of the filter elements 124 can be varied to achieve a flux within the ranges desired herein. In some illustrative embodiments, the flow of pre-separated fluid into the separation vessel 26 and processed fluid out of the separation vessel 26 can be different.

In some embodiments, the flow rate through the vessel 26 (and thus, through the filtration unit 120) is variable (per the ranges discussed above). In such embodiments, the filter element surface area can be varied in order to achieve the target flux rates discussed above. In this manner, the number of filtration packs 122 and/or the dimensions of the filter elements 124 within a filtration pack 122 can be varied to achieve the target flux rates for a particular flow rate. In this manner, the filtration packs 122 are modular, as will be discussed in greater detail below, in that each pack can be individually inserted and removed from the vessel 26.

An increased square footage of filter media minimizes the flow rate per media area (or flux). At very low flux rates per unit of media area, the dirt or particle holding capacity of the filtration unit 120, the filtration packs 122, and the individual filter elements 124 increases exponentially, which leads to longer operation time before the filtration unit 120, the filtration pack(s) 122, and/or the individual filter elements 124 need to be changed due to limited differential pressure. The mechanism of ultra-low flux theory is that particles do not have a large enough face velocity to penetrate or clog pores in the filter media 140 of the filter elements 124. More particularly, solid particles hit the filter media 140 and fall to the bottom of the separation vessel 26, rather than collecting in the filter media 140. Conversely, at a higher flux, the particles would have a large enough face velocity to penetrate and clog the pores in the filter media 140 of the filter elements 124. The systems described herein capitalize on the ultra-low flux theory by increasing the number of filter elements 124 through which the pre-separated fluid flows, thereby decreasing the flux to a low enough number that filter element 124 life (and, thus, filtration unit 120 and filtration pack 122 life) is lengthened from several days to months. This increased life decreases operational expenditures dramatically, as will be discussed in more detail herein.

The particle separation system 20 can include a control system 168 for controlling operation of the system 20. In some embodiments, as seen in FIG. 6, the pump system 24 includes inlet and outlet pumps 170, 172, which can be controlled by variable frequency drives. In some embodiments, the control system 168 can include electronically actuated ball valves 174, 176 that control flow of pre-separated fluid through the first and second transfer lines 40, 44 into the separation vessel 26 and through the third and fourth transfer lines 47, 50 out of the separation vessel 26, respectively. In some embodiments, the control system 168 can include one or more flow meters 178, 180, for example, within the first and/or second transfer lines 40, 44 and/or within the third and/or fourth transfer lines 47, 50 for monitoring flow into and out of the separation vessel 26, respectively. In some embodiments, the control system 168 can include a pressure sensor 182 within the first and/or second transfer lines 40, 44 to monitor a pressure of pre-separated fluid into the separation vessel 26. In some embodiments, the control system can include one or more level sensors 184 within the separation vessel 26 for monitoring a level of fluid within the separation vessel 26. One or more level sensors 186 can also be included in the source tank(s) 22 for monitoring a level of fluid. The control system 168 receives feedback from the various sensors within the particle separation system 20 and changes parameters of the system based on such feedback. The feedback can include, but is not limited to, inlet flow rate, outlet flow rate, sensing of different conditions, alarms, notifications, or any other suitable feedback.

Figure 7:
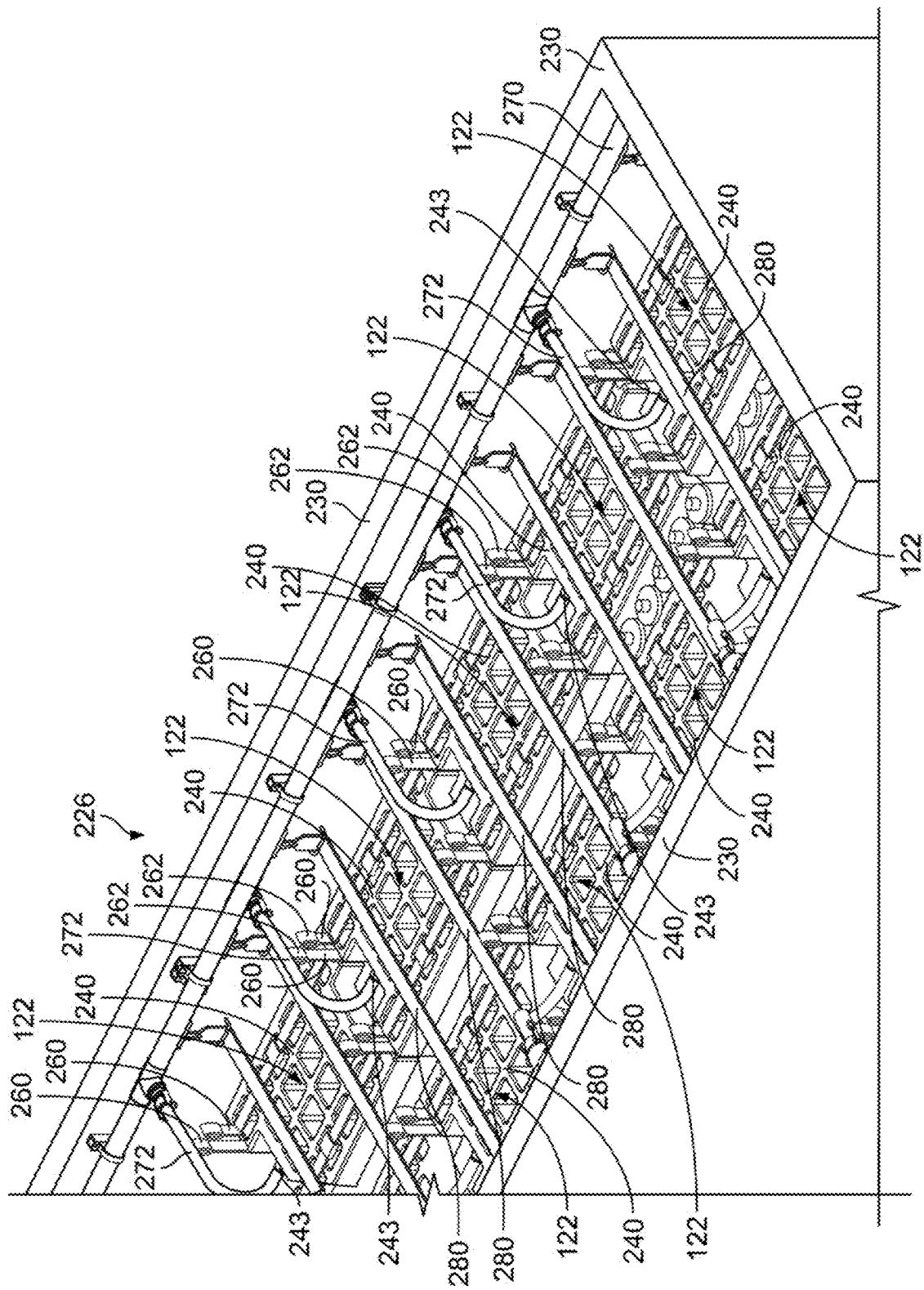
FIG. 7 is a partial, top perspective view of a separation vessel with a top wall removed and depicting a filtration unit including a plurality of filtration packs each including a plurality of filter elements.

Referring now to FIG. 7, a further embodiment of a separation vessel 226 is depicted. The separation vessel 226 can be included in any of the systems disclosed herein, can include any of the features described above with respect to FIGS. 1-6, and can function in the same manner (i.e., at a high flow rate and/or low flux). The separation vessel 226 includes a filtration unit 220 with a plurality of filtration packs 222 including a plurality of filter elements 224. The filtration unit 220 will now be described in detail, it being understood that all other components and features of the separation vessel 226 (and the system in which the separation 226 vessel is employed) can be as disclosed with respect to the vessel 26 of FIGS. 1-6 and the system in which the vessel 26 is employed, for example, as seen in FIGS. 14A-14C.

Figure 8:
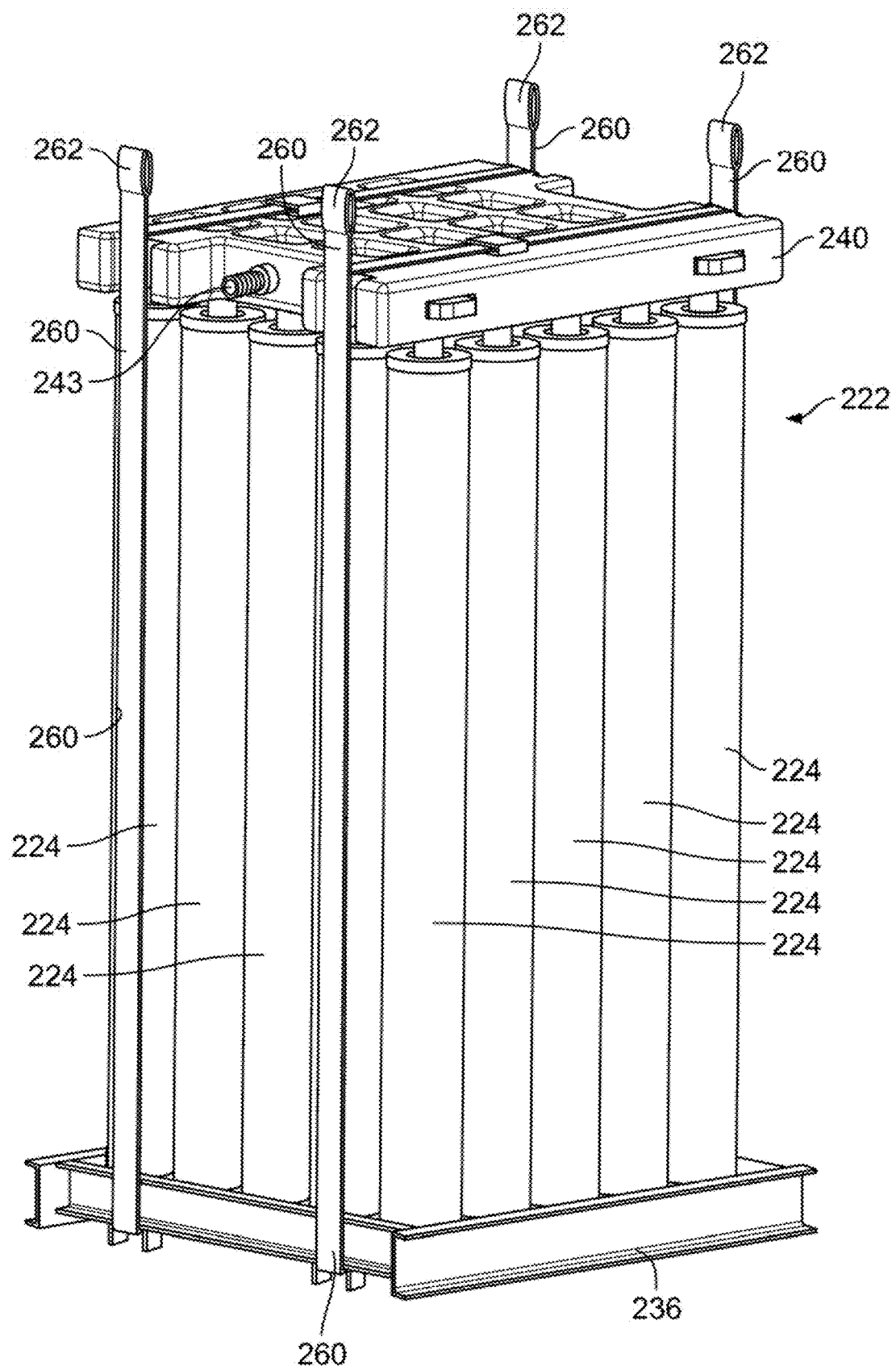
FIG. 8 is a front, top perspective view of a filtration pack of FIG. 7.

The separation vessel 226 includes a plurality of walls 230 forming the separation vessel 226 that form an internal or main filtration chamber 232. The filtration packs 222 of the filtration unit 220 occupy at least a portion of the internal chamber 232. Referring to FIG. 8, each filtration pack 222 can generally include a plurality of filter elements 224 arranged in a parallel manner. In some embodiments, the filtration unit 222 includes 25 filter elements 124, for example, in a five by five orientation. In other embodiments, any number of filter elements in any orientation can be utilized.

Figure 9:
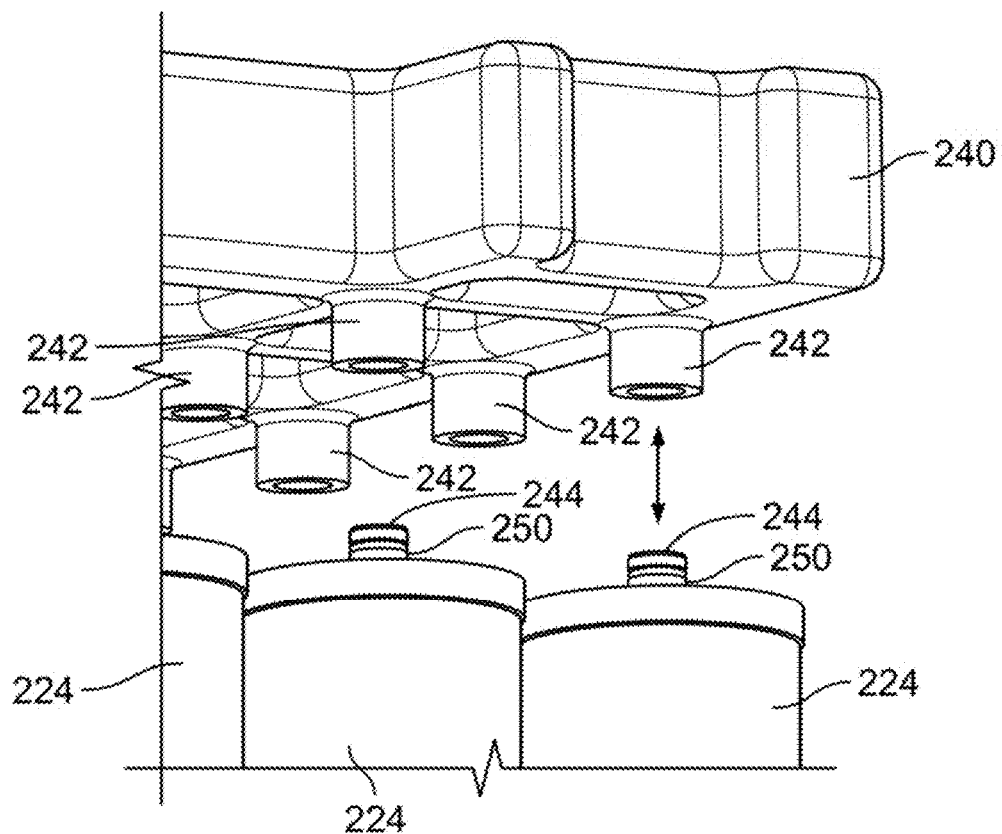
FIG. 9 is a bottom perspective view of a connection between the filter elements of the filtration pack of FIG. 8 and a manifold.

First ends 234 of the filter elements 224 can be positioned in a frame 236 and second ends 238 of the filter elements 224 can be connected to a manifold 240. The frame 236, which can be made of steel or another suitable material, can include a plurality of slots (not shown) for insertion of a second end 238 of each filter element 224 in each of the slots to retain the filter elements 224 within the frame 236 and in relation to one another. In other embodiments, the filter elements 224 can be retained within the frame 236 in any suitable manner. The manifold 240, as seen in FIGS. 8 and 9, is a hollow structure with a plurality of input ports 242 for connection of an outlet tube 244 of each filter element 224 and an outlet port 243, as will be discussed in greater detail below. In some embodiments, each outlet tube 244 can fit within a corresponding port 242 of the manifold 240 through an interference fit. In such an embodiment, an O-ring 150 can be positioned around the outlet tube 244 to further the interference fit, create a seal, and prevent leakage between the outlet tube 244 and the port 242. The ports 242 and the outlet tubes 244 are positioned and aligned such that each of the filter elements 224 of the filtration pack 222 can be connected to the manifold 240 at the same time. In other embodiments, the input ports 242 and the outlet tubes 244 can be formed in any suitable manner that would provide for quick and easy attachment of a plurality of outlet tubes 244 of a plurality of filter elements 224 to a plurality of input ports 242 of a single manifold 240 at the same time.

As further seen in FIG. 9, the filtration pack 222 can include a number of arms 260 connecting the frame 236 and the manifold 240 and including looped ends 262 that allow for connection of an apparatus for lifting the filtration pack 222. In some embodiments, the arms 260 can be in the form of straps or another suitable flexible elements. In other embodiments, the arms are made of a more rigid material. The arms 260 hold the filter elements 224, the frame 236, and the manifold 240 together. Further, each filtration pack 222 can be lifted by the looped ends 262 of the arms 260 to insert and remove the filtration packs 222 from the separation vessel 226. In other embodiments, the arms 260 can include any other suitable structure for holding and moving the filtration packs 222. As seen in FIG. 7, a plurality of filtration packs 222 (that are the same or different) can be inserted into the separation vessel 226. While the filtration packs 222 are shown as occupying most of the separation vessel 226, the filtration packs 222 may not occupy the entire separation vessel 226 (i.e., there can be open space within the vessel 226).

Figure 10:
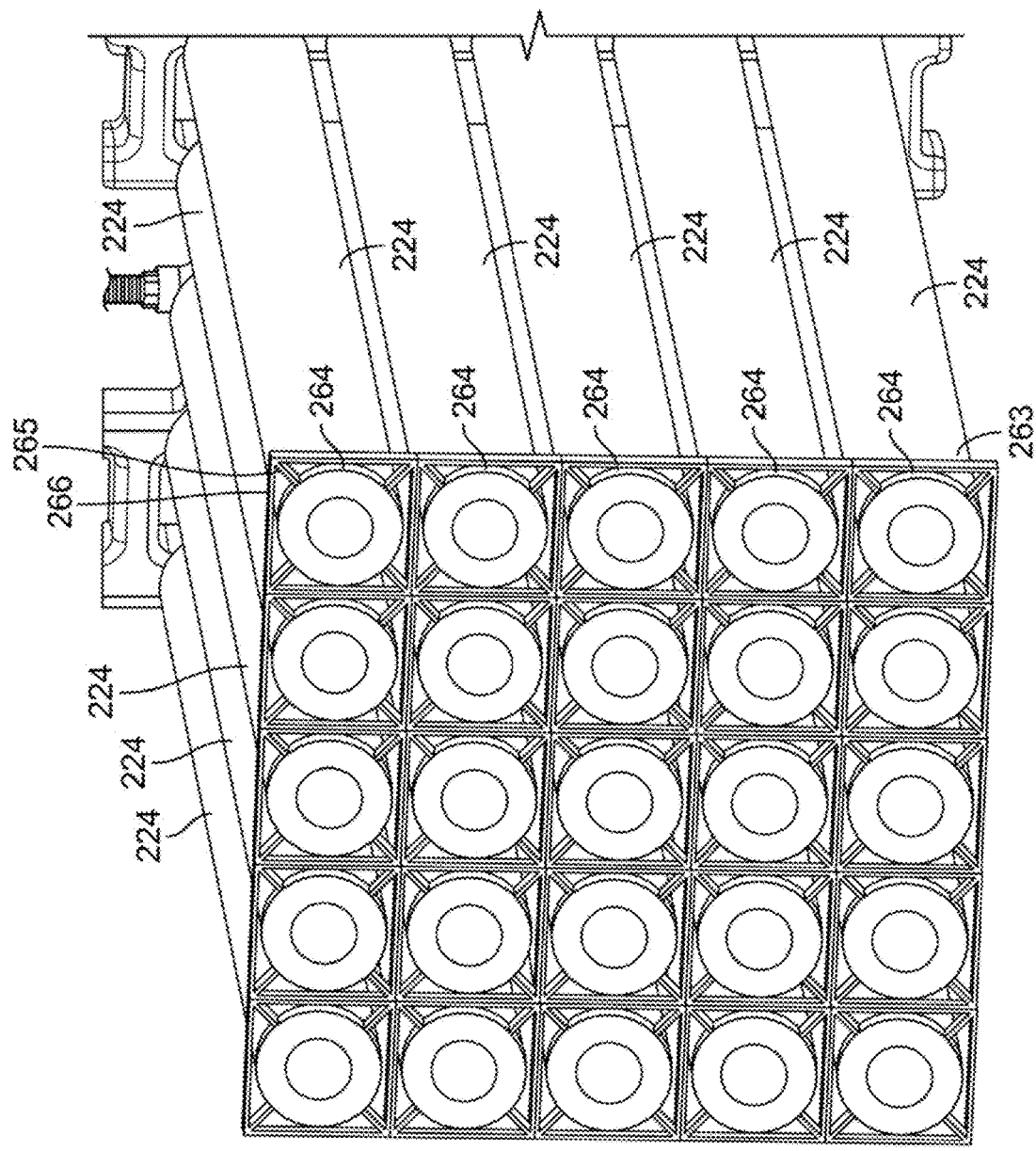
FIG. 10 is a bottom perspective view of the filtration pack of FIG. 8.

As best seen in FIG. 10, a bottom perspective view of the filtration pack 222 is depicted. Each filtration pack 222 includes a molded end cap structure 263 that is separate from or an integral part of the frame 236. The end cap structure 263 is molded in a square shape and can include a number of alignment structures 264 (e.g., circular slots, apertures, or other aligning structures) for holding ends of each of the filter elements 224 in position. The alignment structures 264 can further include connecting structures 265 that couple the alignment structures 264 to individual square-shaped members 266 that together form the end cap structure 263. While one particular member of providing alignment features to ends of the filter elements 224 is depicted, any other suitable alignment feature can be utilized. Further, the shape of the frame 236 and/or molded end cap structure 263 can be varied to accommodate filtration packs 222 of different shapes and/or sizes.

Referring back to FIG. 7, the separation vessel 226 further includes processed fluid conduits 270 on opposing sides of the separation vessel 226. The conduits 270 can be attached to an inner surface of a wall 230 of the separation vessel 226 by brackets or any other suitable manner. The conduits 270 are configured to transport clean fluid (i.e., by pulling the fluid through the vessel 226 utilizing a downstream pump) from the filtration packs 222 out of the separation vessel 226. More particularly, pack conduits 272 are connected between each of outlet portion 243 and a respective processed fluid conduit 270.

When the filtration packs 222 are first inserted into the separation vessel 226, the filter elements 224 are clean and dry and, thus, create an upward buoyant force. In order to retain the filtration packs 222 in place within the separation vessel 226 (in a vertical direction), retention straps 280 can be attached, for example by brackets or any other suitable mechanism, to opposing walls 230 of the separation vessel 226. In some embodiments, the retention straps 280 are positioned immediately above the manifolds 240 when the frame 236 is positioned on a bottom wall of the separation vessel 26. In other embodiments, the retention straps 280 can be located at any suitable position. While the retention straps 280 are shown as being made of a flexible material, the straps 280 may alternatively be made of a rigid material or a combination of flexible and rigid materials.

Still referring to FIG. 7, the manifold 240 of each of the filtration packs 222 is coupled to the conduits 270 by the pack conduits 272. As described in detail above, the contaminated is pulled through the separation vessel 226 by a pump downstream of the separation vessel 226. In this manner, the systems disclosed herein are non-pressurized or lack a pressurized vessel (i.e., the system is at atmospheric pressure). Instead, the systems disclosed herein utilize a suction-side pump that draws fluid through the system. One advantage of a non-pressurized system is cost. Pressurized systems require specific vessels that cost significantly more for the same amount of filtration. Utilizing a non-pressurized system eliminates the need for such expensive vessels.

Figure 11:
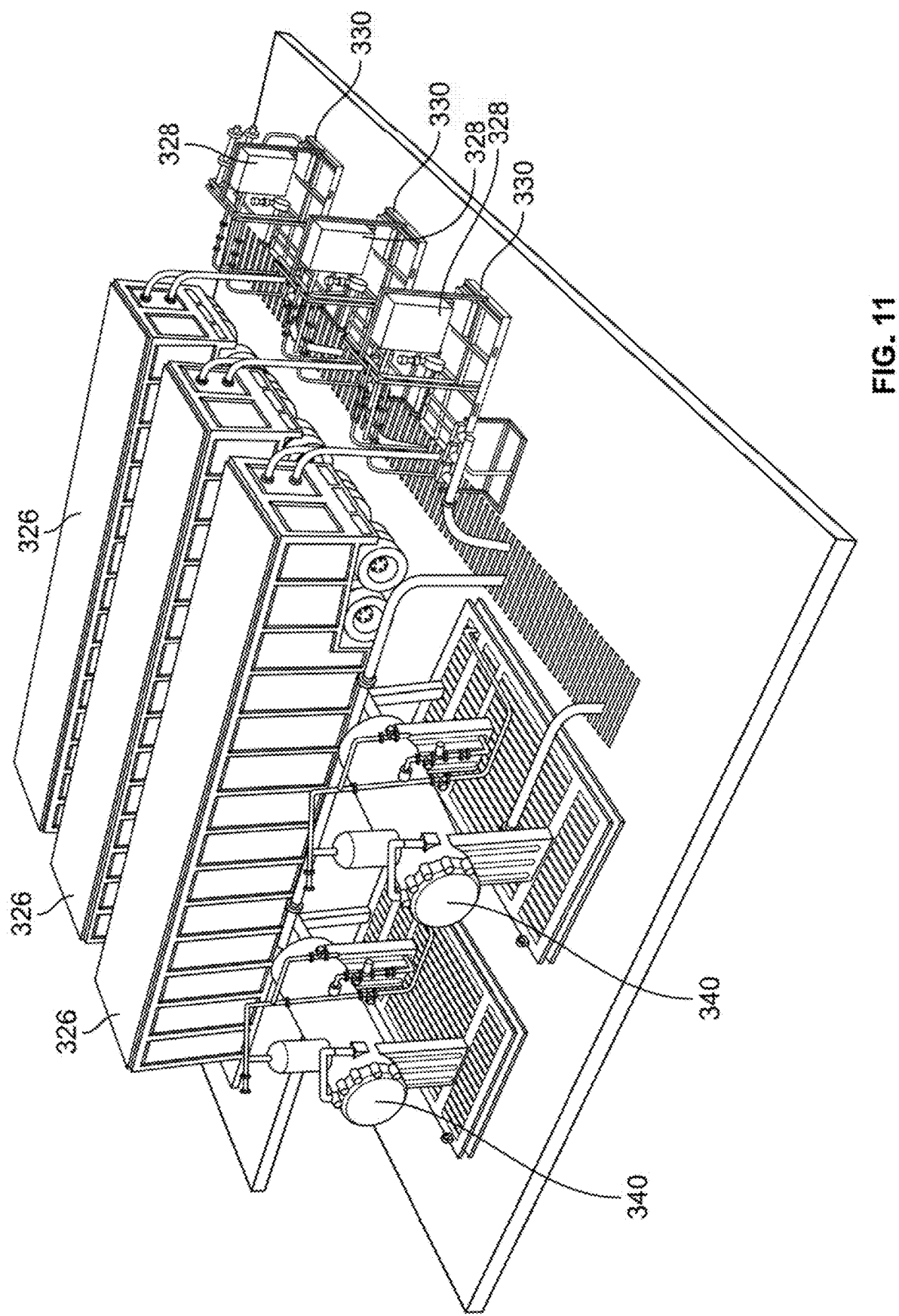
FIG. 11 is a top perspective view of an embodiment of a two stage filtration system including any of the methods of particle separation and/or any of the separation vessels disclosed herein.
Figure 12:
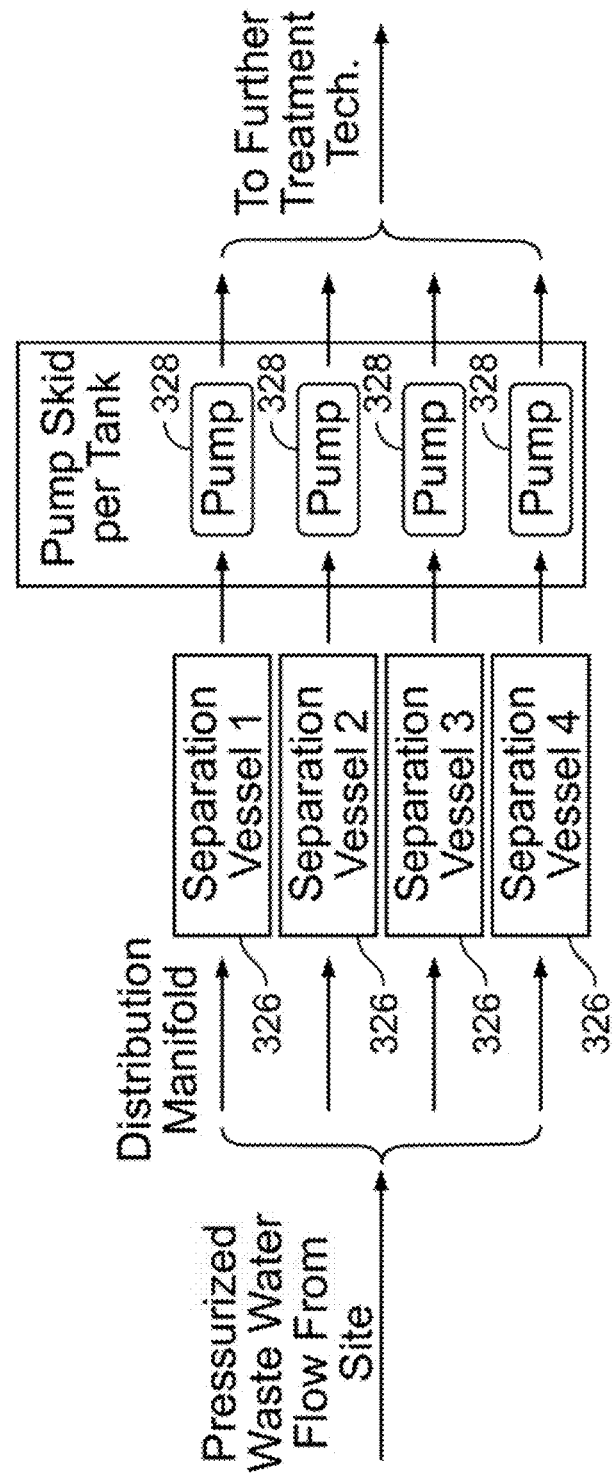
FIG. 12 is a diagrammatic view of a portion of the two stage filtration system of FIG. 11.

In some embodiments, as seen in FIGS. 11 and 12, any of the separation vessels herein can be included as part of a two (or more) stage filtration system 300. For example, the separation vessels discussed herein are utilized to separate particles from a pre-separated fluid and/or to skim oil from an oil/water emulsion. It may also be desirous to provide a coalescing stage to remove oil and/or to provide other filtration steps. Some systems 300 can include any number of separation vessels 326 (which can be any of the separation vessels disclosed herein). Pre-separated fluid is provided from a tank or other site (see FIG. 12) through a distribution manifold to a number of different separation vessels 326. The pre-separated fluid is pulled through each of the separation vessels 326 by a respective pump 328 positioned, for example, on a pump skid 330. The pumps 328 can then pump processed or treated fluid from the separation vessels 326 to additional treatment stages, for example, coalescers 340, which remove oil from the treated fluid. A collection manifold 342 can be positioned between the pumps 328 and the additional filtration stages 340 to control the flow therebetween and to monitor the fluid (e.g., the quality, pressure, etc.) flowing therebetween. While coalescers are discussed, any additional filtration treatment process(es) can be utilized in combination with the separation vessels 326 and/or numerous additional filtration treatment processes can be utilized. In some embodiments, absorption beds can be utilized. In other embodiments, the other filtration or treatment processes can be pre-treatment processes in that they can be positioned upstream (i.e., before) the separation vessels 326.

In any of the embodiments discloses herein, one or more aerators or bubblers can be disposed, for example, on the bottom wall 102, one or more side walls 104, or at any other suitable location within the separation vessel 26. The aerator or bubbler would act to inject air (or possibly a fluid, such as water) into the separation vessel 26 to create a disturbance, which may assist in moving fluid through the separation vessel 26 and/or in the filtration process.

In any of the embodiments discloses herein, a back-pulsing operation may be implemented within any of the systems. More particularly, the flow through the separation vessel may be reversed to remove solids from the filter elements of one or more filtration packs, and then may be returned to the original flow direction. The back-pulsing operation may improve the life of the individual filter elements.

As can be seen from the foregoing figures, the separation vessels 26, 226 of the particle separation system can be portable and replaceable. More particularly, the separation vessel 26, 226 can be on wheels or can be capable of being placed on a trailer or other structure for moving the separation vessel 26, 226. The separation vessel 26, 226 can be connected and unconnected from the source tank(s) 22 (or other location) and the pump system 24 and can be removed from the particle separation system 20 and a new separation vessel 26, 226 can replace the original separation vessel 26, 226. Use of the separation vessel 26, 226 causes buildup and soiling of the filter elements 124, 224 within the separation vessel 26, 226. In current systems, the system must be stopped and the filter elements must be cleaned, which takes a long time, thereby resulting in significant downtime, which leads to higher costs. In the present particle separation system 20, the separation vessel 26, 226 can be disconnected from the source tank(s) 22 (or other location) and the pump system 24, 224 and immediately replaced with a new separation vessel 26, 226, resulting in very little downtime. The old separation vessel 26, 226 can then be transported to a facility for cleaning of the filter elements 124, 224 and other components within the separation vessel 26, 226. The separation vessel 26, 226 is, therefore, also portable. More specifically, the vessel can be transferred to, for example, a flatbed truck or another vehicle for transport thereof and/or can include wheels or other mobilizer for moving the separation vessel 26, 226 short distances.

In some embodiments, the separation vessel 26, 226 can be modular. More specifically, the separation vessel 26, 226 can be equipped to hold any suitable number of outlet manifolds 156, 240 for accommodating a number of slots X for up to X filtration packs 122, 222. The separation vessel 26, 226 can also be equipped with appropriate shutoff valves or other equipment to deactivate one or more of the outlet manifolds 156, 240. In this manner, dependent upon a particular application, any number of the slots X can include filtration packs 122, 222. For example, if the separation vessel 26, 226 includes six slots to accommodate up to six filtration packs and the separation vessel 26, 226 is utilized for a first application, filtration packs 122, 222 can be installed in each of the six slots and all six filtration packs 122, 222 may be active. In another application, filtration packs 122, 222 may be installed in each of the 6 slots, but less than six of the filtration packs 122, 222 may be active. In yet another application, filtration packs 122, 222 may be installed in less than all six slots (for example, three). In situations where filtration packs 122, 222 are installed and not utilized or not installed at all, the respective manifolds may be deactivated. The above-described modular system allows for customization of a system by installing a suitable number of filtration packs 122, 222 and by further allowing for selective activation and deactivation of filtration packs 122, 222 dependent upon the particular application.

In some embodiments, the systems disclosed herein can be offered as a rental model. In this manner, site personnel do not need to remove and replace hundreds of filter elements at once. Rather, the entire separation vessel may be removed from a particular site and replace with a new separation vessel. This model also greatly reduces downtime, as it takes significant time to remove and replace hundreds of filtration elements.

While the various embodiments of the particle separation system 20 described herein have been described as a stand-alone system, the particle separation system 20 may optionally be used in combination with any other filtration, separation, or any other suitable systems. In illustrative embodiments, one or more particle separation systems 20 may be utilized in combination with one or more of hydrocarbon recovery technology, liquid-liquid separation technology, solids removal technology, or any other technologies for processing, filtering, and/or cleaning fluids.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A particle separation system, comprising:
a vessel having at least one side wall and a bottom wall forming an internal chamber within the vessel;
a filtration unit positioned within the vessel and comprising:
a first filtration pack comprising a first plurality of filter elements having a first plurality of outlets on a first end of the first plurality of filter elements;
a first single manifold having a first plurality of inlets, a number of the first plurality of inlets being equal to a number of the first plurality of outlets, the first plurality of outlets and the first plurality of inlets being capable of coupling such that a flow through each of the first plurality of filter elements enters the first single manifold;
the first single manifold including a first outlet channel for flow from the first single manifold to a processed fluid conduit;
a second filtration pack comprising a second plurality of filter elements having a second plurality of outlets on a first end of the second plurality of filter elements;
a second single manifold having a second plurality of inlets, a number of the second plurality of inlets being equal to a number of the second plurality of outlets, the second plurality of outlets and the second plurality of inlets being capable of coupling such that a flow through each of the second plurality of filter elements enters the second single manifold;
the second single manifold including a second outlet channel for flow from the second single manifold to the processed fluid conduit;
a first frame for holding the first filtration pack, the first frame including a first end cap structure comprising a plurality of first alignment structures, each of the first alignment structures holding a second end of each of the first plurality of filter elements, and a plurality of first connecting structures that connect the first alignment structures to the first frame; and
a second frame for holding the second filtration pack, the second frame including a second end cap structure comprising a plurality of second alignment structures, each of the second alignment structures holding a second end of each of the second plurality of filter elements, and a plurality of second connecting structures that connect the second alignment structures to the second frame;
wherein the first plurality of outlets of the first filtration pack are positioned and aligned such that all of the first plurality of outlets are capable of coupling to all of the first plurality of inlets of the first single manifold at the same time, and the second plurality of outlets of the second filtration pack are positioned and aligned such that all of the second plurality of outlets are capable of coupling to all of the second plurality of inlets of the second single manifold at the same time.

2. The particle separation system of claim 1, wherein each of the first and second filtration packs is independently removable and replaceable such that each of the first plurality of filter elements are removed together and each of the second plurality of filter elements are removed together.

3. The particle separation system of claim 2, wherein pre-separated fluid flows into the vessel at a rate of between about 10 and about 1000 gallons per minute (GPM) and a flux within the filtration unit is less than or equal to about 0.05 gallons per minute per square foot (GPM/ft$^2$).

4. The particle separation system of claim 1, further including:
a first set of arms extending between the first frame and the first manifold, the first set of arms connecting the first frame and the first manifold and retaining the first plurality of filter elements in position; and
a second set of arms extending between the second frame and the second manifold, the second set of arms connecting the second frame and the second manifold and retaining the second plurality of filter elements in position.

5. The particle separation system of claim 1, wherein pre-separated fluid is moved through the vessel using a pump positioned downstream of the vessel.

6. The particle separation system of claim 1, further including a plurality of vessels and a plurality of pumps for moving pre-separated fluid through the plurality of vessels.

7. A particle separation system, comprising:
a vessel having at least one side wall and a bottom wall forming an internal chamber within the vessel;
a filtration unit positioned within the vessel and comprising:
a filtration pack comprising a plurality of filter elements having a plurality of outlets on a first end of the plurality of filter elements;
a single manifold having a plurality of inlets, the plurality of outlets and the plurality of inlets being capable of coupling such that a flow through each of the plurality of filter elements enters the single manifold; and
a frame for holding the filtration pack, the frame including an end cap structure comprising a plurality of alignment structures, each of the alignment structures corresponding to one of the plurality of filter elements and holding a second end of the corresponding filter element, and a plurality of connecting structures that connect the alignment structures to the frame;
wherein the plurality of outlets are positioned and aligned such that all of the plurality of outlets are capable of coupling to all of the plurality of inlets of the single manifold at the same time.

8. The particle separation system of claim 7, wherein the end cap structure further comprises a plurality of substantially square-shaped members that define the relative position of each of the plurality of filter elements with respect to one another.

9. The particle separation system of claim 7, wherein the alignment structures comprise one or more of circular slots or apertures.

10. The particle separation system of claim 7, wherein the filtration unit further comprises at least one arm connecting the frame to the manifold.

11. The particle separation system of claim 10, wherein the at least one arm includes a looped end for lifting the filtration unit.

12. The particle separation system of claim 10, wherein the at least one arm is provided in the form of a flexible strap.

13. The particle separation system of claim 7, wherein each of the plurality of outlets is sized and shaped to provide an interference fit with a corresponding one of the plurality of inlets.

14. The particle separation system of claim 13, wherein an o-ring is positioned around each of the plurality of outlets to seal the interference fit.

15. The particle separation system of claim 7, further comprising at least one pump and at least one transfer line fluidly coupling the at least one pump to the vessel.

16. The particle separation system of claim 15, further comprising a control system that receives feedback from one or more of a pressure sensor in the at least one transfer line, a flow meter in the at least one transfer line, or a level sensor in the vessel.

17. The particle separation system of claim 16, wherein the control system changes parameters of the particle separation system in response to the feedback.

18. The particle separation system of claim 16, wherein the control system controls at least one electronically actuated valve positioned in the at least one transfer line.

19. A particle separation system, comprising:
a vessel having at least one side wall and a bottom wall forming an internal chamber within the vessel;
a filtration unit positioned within the vessel and comprising:
a filtration pack comprising a plurality of filter elements having a plurality of outlets on a first end of the plurality of filter elements;
a single manifold having a plurality of inlets, the plurality of outlets and the plurality of inlets being capable of coupling such that a flow through each of the plurality of filter elements enters the single manifold; and
a frame for holding the filtration pack, the frame including an end cap structure comprising a plurality of alignment structures, each of the alignment structures corresponding to one of the plurality of filter elements and holding a second end of the corresponding filter element, and a plurality of connecting structures that connect the alignment structures to one another;
wherein the plurality of outlets are positioned and aligned such that all of the plurality of outlets are capable of coupling to all of the plurality of inlets of the single manifold at the same time.

* * * * *